United States Patent [19]

Tibbetts

[11] 4,391,787

[45] Jul. 5, 1983

[54] METHOD FOR GROWING GRAPHITE FIBERS

[75] Inventor: Gary G. Tibbetts, Birmingham, Mich.

[73] Assignee: General Motors Corporation, Detroit, Mich.

[21] Appl. No.: 281,864

[22] Filed: Jul. 9, 1981

Related U.S. Application Data

[63] Continuation-in-part of Ser. No. 170,282, Jul. 18, 1980, abandoned.

[51] Int. Cl.³ .......................... C01B 31/04; D01F 9/12
[52] U.S. Cl. ................................. 423/447.3; 423/448; 423/458
[58] Field of Search ....................... 423/447.3, 448, 458

[56] References Cited

U.S. PATENT DOCUMENTS

| | | | |
|---|---|---|---|
| 2,796,331 | 6/1957 | Kauffman et al. | 423/447.3 |
| 3,378,345 | 4/1968 | Bourdeau et al. | 423/447.3 |
| 3,664,813 | 5/1972 | Holland | 156/613 |
| 4,014,980 | 3/1977 | Fujimaki et al. | 423/448 |

OTHER PUBLICATIONS

Koyama et al., bJapanese Journal of Applied Physics" vol. 11, No. 4, Apr. 1972, pp. 445-449.

*Primary Examiner*—Edward J. Meros
*Attorney, Agent, or Firm*—Douglas D. Fekete

[57] ABSTRACT

In the preferred embodiment, graphite fibers that are 5 to 15 microns in diameter and up to several centimeters long are grown within a thin-walled stainless steel tube by flowing natural gas through the tube, concurrently contacting the outer tube surface with wet hydrogen gas and heating to between 925° C. to 1075° C. to decompose methane in the natural gas to grow fibers on the inner surface of the tube.

14 Claims, 1 Drawing Figure

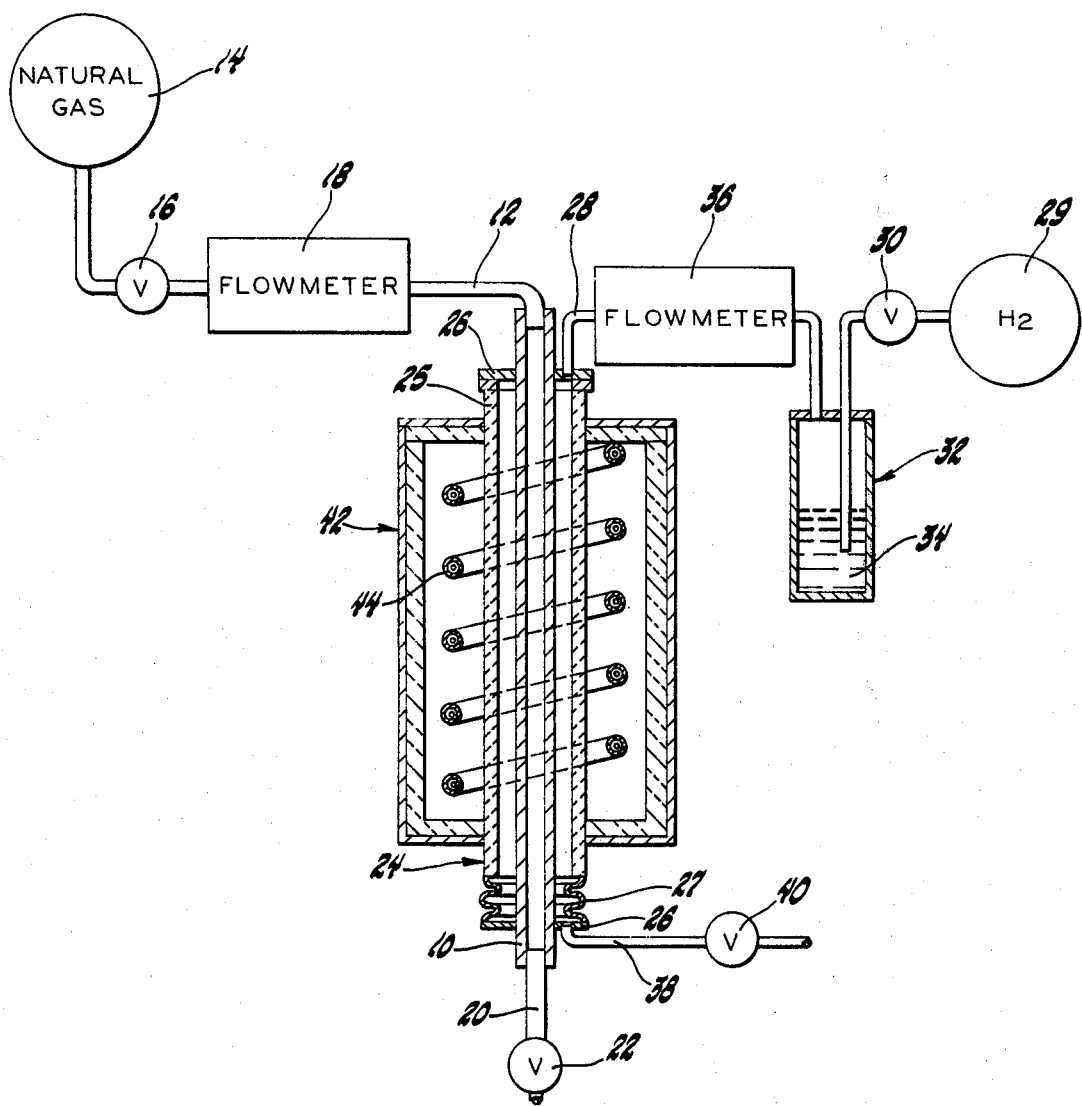

length was 42.5 centimeters. Metal end caps 26 hermetically sealed tube 10 to cylinder 25 and included bellows 27 to compensate for differential thermal expansion. Compression fittings (not shown) between tube 10 and caps 26 permit the tube to be uncoupled and removed for conveniently collecting fibers. An inlet 28 to jacket 24 at the end near tube inlet 12 was suitably connected to a source of hydrogen 29 through a valve 30, a bubbler 32 containing water 34 and a flowmeter 36. An outlet 38 comprising a valve 40 was provided at the other end of jacket 24.

METHOD FOR GROWING GRAPHITE FIBERS

BACKGROUND OF THE INVENTION

This is a continuation in part of U.S. patent application Ser. No. 170,282, filed July 18, 1980, now abandoned.

This invention relates to the manufacture of graphite fibers suitable for use as a filler in plastic or other composites. Preferred graphite fibers are 5 to 15 microns in diameter and up to several centimeters in length.

It is an object of this invention to provide a new method for manufacturing graphite fibers in high yield by the pyrolysis of a hydrocarbon gas, which fibers are suitable for filler in plastic or other composites.

More particularly, it is an object of this invention to provide an improved method for producing relatively inexpensive graphite fibers in high yield from commercial natural gas, which method comprises thermally decomposing methane from the natural gas in contact with a thin iron-chromium alloy wall, while remotely contacting the wall with wet hydrogen gas under conditions that cause the methane decomposition product to form the graphite fibers.

SUMMARY OF THE INVENTION

In accordance with a preferred embodiment, graphite fibers are grown within a thin-wall stainless steel tube by flowing natural gas through the tube, while surrounding it with wet hydrogen gas. The tube and gases are heated at between 925° C. and 1075° C. Under these conditions, methane in the natural gas readily decomposes within the tube and forms thin, straight fibers that protrude obliquely from the inner tube surface generally in a downstream direction. The fibers are formed of graphite and are characterized by a cross section resembling a rolled-up scroll. Fiber growth is preferably continued for sufficient time to form product fibers that are up to about 12 centimeters long and have diameters between 5 to 100 microns, preferably 5 to 15 microns. The product fibers are well suited for use as a plastic filler and are relatively inexpensive, in part because they are produced from relatively inexpensive natural gas.

DESCRIPTION OF THE DRAWINGS

The only FIGURE is a cross-sectional schematic view of an apparatus for growing fibers in accordance with this invention.

DETAILED DESCRIPTION OF THE INVENTION

Referring now to the FIGURE, in the preferred embodiment, graphite fibers were grown within a cylindrical steel tube 10. Tube 10 was preferably composed of type 304 stainless steel containing about 20% chromium. The outer diameter was 1.25 centimeters and the wall thickness was about 0.8 millimeter. The overall length was about 75 centimeters, although fibers grew only within a section about 20 centimeters long. Tube 10 was connected at one end to a gas inlet 12 that was in turn connected to a source of natural gas 14, through a valve 16 and a flow meter 18 for regulating the natural gas flow. A gas outlet 20 having a valve 22 was connected to the other end of tube 10 for venting exhaust gases.

A jacket 24, comprising an alumina cylinder 25, coaxially surrounded a central portion of tube 10. The inner diameter of cylinder 25 was 3.1 centimeters and the Tube 10 and jacket 24 were positioned through an insulated furnace 42 having a coiled resistance heating element 44. Furnace 42 heated about 20 centimeters of tube 10 at the desired temperature and fiber growth occurred substantially in that portion of the tube.

Before heating furnace 42, tube 10 and jacket 24 were evacuated and checked for air leaks, and then thoroughly flushed with natural gas and hydrogen, respectively. Tube 10 and jacket 24 were then heated to about 970° C. The natural gas flow through tube 10 was adjusted to about 20 cc/min, corresponding to a residence time of about 60 seconds within the 20 centimeter length where fiber growth occurred. The hydrogen flow through jacket 24 was adjusted to about 200 cc/min. Bubbler 32 was maintained at about room temperature and substantially saturated the hydrogen flowing therethrough. The gas pressures within the tube and the jacket were about atmospheric.

Under these conditions, fibers began to grow after a few hours. Fibers grew out from the inner surface of tube 10 at an acute angle thereto pointing in the downstream direction. Very thin fibers rapidly grew to substantially full length and thereafter principally grew radially. After about 24 hours, tube 10 was uncoupled from the remaining equipment and the fibers were knocked out using a brush.

The product fibers were generally straight and cylindrical and resembled very hard, very thin pencil leads. The fibers varied in length from less than a centimeter up to about 12 centimeters. However, the fibers were remarkably uniform in diameter, ranging, for example, between 10 and 15 microns. Electron microscopic examination revealed that the fiber cross section was spiral or scroll-like. That is, the graphite basal planes were helically oriented, in contrast to the radial basal plane orientation found in commercially available graphite fibers derived from pitch pyrolysis. Young's moduli of a representative batch of fibers were tested using an Instron tensil testing machine and were between 0.8 and $3.8 \times 10^{11}$ Pascals, thinner fibers having generally higher moduli. Thus, the fibers were well suited for use as a filler material.

Although I do not wish to be limited to any particular theory, I believe the following. Stainless steel initially bears a very thin protective oxide film as a result of being exposed to air. The film comprises chromium oxide and iron oxide. Under the conditions of the described embodiment, hydrogen diffuses from jacket 24 through tube 10 to the inner surface and reduces oxide there to metal. Concurrently, methane decomposes and carburizes the steel, including the metal derived from the oxide. Some carbon diffuses through the tube wall, eventually reaching the outer surface where it is extracted by the wet hydrogen gas. It has been found that up to about one-eighth of the carbon present in the natural gas introduced into tube 10 in the described embodiment ends up in the hydrogen exhaust gas. Thus, the described embodiment involves concurrent carburizing of the inner surface of tube 10 and decarburizing of the outer surface.

It is also believed that carburization of metal derived from the reduced oxide film produces a metal carbide characterized by a $M_7C_3$ formula, where M is a combination of chromium and iron. Since iron typically forms $Fe_3C$, sufficient chromium is required to form $M_7C_3$. It is estimated that about half of the metal is chromium.

$M_7C_3$ carbide is believed to catalytically decompose methane in natural gas to form a fiber precursor. In experiments, equipment of the detailed embodiment was modified to include a quartz window that provided visual access into tube 10 during fiber growth. At fiber-growing temperatures, the hot tube glowed red to light the interior. Initially gas within the tube appeared clear. However, after a few hours when fiber growth began, the gas appeared cloudy, indicating the presence of particles. The carbide is believed to be involved in forming the particles which grow the fiber.

In the described embodiment, opposite surfaces of the tube wall are separately contacted with a carburizing gas (natural gas) and a decarburizing gas (wet hydrogen). Natural gas is preferred for the carburizing gas because it is relatively plentiful and inexpensive and produces fibers in high yield. Preferred natural gas contains, by weight, 0.5% nitrogen, 0.6% carbon oxides, 4.0% ethane, 1.1% higher hydrocarbons and the balance methane. The gas is commercially obtained, in bottled form, from Airco, Inc., and designated methane grade 1.3. City natural gas containing 1.2% nitrogen, 0.7% total carbon oxides, 1.9% ethane, 0.6% hydrogen, 0.5% heavy hydrocarbons and the balance methane also produces good fibers. Natural gas produces eight or more times the fiber density as methane, indicating that minor constituents in natural gas, such as ethane or carbon oxides, significantly promote fiber growth.

High fiber yields are obtained by flowing wet hydrogen gas through the jacket. Although in the described embodiment wet hydrogen decarburized the outer tube surface, fibers have been grown in a tube surrounded by wet hydrogen even though no decarburization actually occurred. Dry hydrogen flowed through the jacket also grew fibers, although fiber density was over an order of magnitude less than for wet hydrogen. Wet nitrogen also produced fibers, but the density was also generally less than for wet hydrogen. Nitrogen is believed to be inert to the steel during fiber growth. Air or dry nitrogen produced few fibers, if any.

Fiber density is relatively insensitive to the flow rate of wet hydrogen gas through the jacket. Rates up to about 400 cc/min were suitable in the apparatus of the described embodiment. Also, brief interruptions in flow apparently do not affect fiber growth. However, fiber diameter is related to the flow rate. Optimum diameters are produced at flow rates of 20 to 40 cc/min. Also, fiber size is related to water content in the wet hydrogen. Drier hydrogen produces generally longer fibers that are more uniform in diameter, whereas wetter hydrogen produces a greater density of shorter fibers.

As discussed herein, fiber growth is believed to be related to chromium oxide initially on the inner tube surface. Preferably chromium in the oxide is derived from chromium alloyed in the steel. It has been found that fiber density increases as the chromium concentration increases. Type 304 stainless steel containing 20 weight percent chromium produces a high density of fibers and is preferred. Type 4130 steel containing about 1% chromium also produces dense fiber growth. Steel selected from the 1010 series and containing 0.1% chromium produces more widely scattered fibers and may be preferred for growing thicker fibers. However, 1010-series steel containing about 0.01% chromium did not appreciably grow fibers.

In another embodiment, the apparatus in the FIGURE was modified to flow wet hydrogen through tube 10 and natural gas through jacket 24. Fiber growth occurred on the outer surface of the tube. The method of this invention is also suitable for fiber growth on nontubular walls having opposite surfaces in contact with natural gas and wet hydrogen. Wall thicknesses are suitably less than about 3.0 mm and preferably between about 0.5 to 1.0 mm. In general, thinner walls enhance fiber growth. This is believed at least partially due to the higher diffusion rates of hydrogen or carbon through a thinner wall.

Although the method of this invention has been adapted to produce fibers having diameters of over 600 microns, the preferred fiber diameter for filler use is between 5 and 15 microns. The length of the longest fibers is believed to be mainly limited by the length of the heated section of the tube. In general, increasing the natural gas flow rate, temperature or fiber-growing time increases fiber size, particularly diameter. For the described apparatus, flow rates suitably range between 10 to 70 cc/min, corresponding to residence time in the fiber growth section of between about 120 seconds to about 17 seconds. Diluting the natural gas before pyrolysis, for example, with hydrogen gas, affects fiber growth similar to reducing the undiluted flow rate. Suitable temperatures range from about 925° C. to 1075° C. or higher, and about 970° C. to 1000° C. is preferred.

In the described embodiment, tube and gases were heated at a constant temperature for about twenty-four hours. During this time, it is believed that a metal carbide first forms, which carbide then catalyzes fiber growth. Growing time may be reduced by adjusting selected reaction conditions to more rapidly form the carbide. For example, at a flow rate of 20 cc/min, onset of fiber growth occurred after about twelve hours. Increasing to 60 cc/min reduces this time to about three hours. Similarly, increasing the temperature reduces the time before fibers begin to grow. After the onset of fiber growth, the reaction conditions may be adjusted for optimum growth. Fiber growth typically requires only a few hours, depending on the desired diameter. Careful removal of fibers from the tube so as not to disturb the carburized surface enables the tube to be reused and reduces the time required for the onset of fiber growth.

Although this invention has been described in terms of certain embodiments thereof, it is not intended that it be limited to the above description but rather only to the extent set forth in the claims that follow.

The embodiments of the invention in which an exclusive property or privilege is claimed are defined as follows:

1. A method for manufacturing graphite fibers by methane pyrolysis, said method comprising
    contacting gaseous methane to a chromium oxide film on one side of a thin hydrogen-permeable wall, while concurrently dissolving hydrogen into the opposite side, and
    heating to form graphite fibers on said first wall side.

2. A method for manufacturing graphite fibers by high temperature decomposition of methane gas, said method comprising contacting a first surface on one side of a hot thin, chromium-containing iron-base alloy wall with a hot gas containing methane while concurrently contacting a second surface on the other side of said wall opposite said first surface with a hot gas selected from the group consisting of dry hydrogen, wet hydrogen and wet inert gases, said wall and said gases being at an elevated temperature sufficient to form said graphite fibers protruding from the first wall surface.

3. A method for manufacturing graphite fibers by high temperature decomposition of methane, said method comprising contacting a first surface of a steel wall with natural gas while concurrently contacting a second opposite surface with a gas selected from the group consisting of hydrogen, wet hydrogen and wet nitrogen, said steel wall containing at least 1 weight percent chromium and being no thicker than about 3 millimeters, and heating the wall and the gases to between about 925° C. and about 1075° C. to form on the first wall surface graphite fibers from the natural gas.

4. A method for manufacturing graphite fibers comprising contacting a first surface of a wall with a gas comprising one or more alkane hydrocarbons of the type found in natural gas and carbon oxides, while concurrently dissolving hydrogen into a second wall surface opposite the first wall surface, said wall being formed of a hydrogen-permeable metal bearing initially chromium oxide on the first wall surface, and heating the wall and gas at a temperature and for a time to form graphite fibers on said first wall surface.

5. A method for manufacturing graphite fibers by high temperature methane decomposition, said method comprising contacting natural gas to a first surface on one side of a thin wall formed of an iron alloy containing chromium in an amount greater than 0.1 percent and effective for growing fibers, concurrently contacting a second surface on the other side of said wall opposite said first surface with a decarburizing gas containing hydrogen, said wall being no thicker between said surfaces than about 3 millimeters, and heating the wall and the gases to decompose the natural gas and to decarburize the second wall surface, whereupon graphite fibers grow on the first wall surface.

6. A method for manufacturing graphite fibers having a scroll-like cross section by high temperature methane decomposition, said method comprising contacting natural gas to a first surface of a wall formed of an iron-chromium alloy effective for growing fibers, concurrently contacting a second surface of the wall opposite said first surface with wet hydrogen gas, the thickness of the wall between said surfaces being less than about 3 millimeters, and heating the wall and the gases to between about 925° C. and about 1075° C. to form scroll-like graphite fibers on the first wall surface.

7. A method for manufacturing graphite fibers having a scroll-like cross section, said method comprising contacting a first surface of a stainless steel wall with natural gas while concurrently contacting a second surface of the wall opposite the first surface with a wet hydrogen gas, said wall being formed of a steel containing at least 1 weight percent chromium and being no thicker than about 1.0 millimeters, and heating the wall and gases to between about 925° C. and about 1075° C. to decompose methane in the natural gas and to grow on the first surface scroll-like graphite fibers that are 5 to 100 microns in diameter and up to several centimeters long.

8. A method for manufacturing graphite fibers comprising flowing natural gas through a thin-wall stainless steel tube while surrounding the tube with wet hydrogen gas, and heating the tube and gases at a temperature and for a time to grow graphite fibers on the natural gas-contacting surface, said fibers having a scroll-like cross section and being about 5 to 100 microns in diameter and up to several centimeters long.

9. A method for manufacturing graphite fibers having a scroll-like cross section, said method comprising flowing natural gas through a stainless steel tube having a wall thickness between about 0.5 to 1.0 millimeters, said natural gas contacting said tube at a surface initially bearing a chromium oxide, surrounding the tube with wet hydrogen gas, and heating the tube and gases to between about 970° C. to 1000° C. to decompose methane in the natural gas and to grow on the natural gas-contacting tube surface scroll-like graphite fibers that are about 5 to 100 microns in diameter and up to several centimeters long.

10. A method for manufacturing graphite fibers by methane pyrolysis comprising thermally decomposing an alkane hydrocarbon adjacent a chromium-bearing surface of thin, hydrogen-permeable metal wall, while concurrently diffusing hydrogen through the wall to said surface, and continuing for a time sufficient to grow graphite fibers.

11. A method for manufacturing graphite fibers by methane pyrolysis comprising thermally decomposing methane adjacent a surface of hydrogen-permeable metal wall bearing a chromium-containing $M_7C_3$ carbide, while concurrently diffusing hydrogen through the wall to said surface, and continuing for a time sufficient to grow graphite fibers.

12. A method for manufacturing graphite fibers by methane pyrolysis comprising thermally decomposing methane from a natural gas source in contact with a first surface of a suitable thin, iron-chromium alloy wall, and concurrently contacting a second surface of the wall opposite said first surface with gas suitable for dissolving hydrogen into the wall, and growing graphite fibers on said first wall surface.

13. A method for manufacturing graphite fibers by high temperature methane decomposition, said method comprising contacting a first surface of a thin chromium-iron alloy wall with a methane-containing gas suitable for carburizing said surface, contacting a second surface of the wall with a gas suitable for dissolving hydrogen into the wall, said first and second surfaces being arranged and spaced such that hydrogen dissolved into the wall at the second surface diffuses to the first surface, and heating the wall and contacting gases at a suitable temperature to decompose methane to carburize the first wall surface to form thereon a chromium-containing $M_7C_3$ carbide species and thereafter to decompose methane in the presence of the carbide to form graphite fibers.

14. A method for manufacturing graphite fibers comprising contacting a first surface of a wall with a gas comprising predominantly methane and a constituent selected from the group consisting of a carbon oxide and a second alkane hydrocarbon of the type found in natural gas, while concurrently dissolving hydrogen into a second wall surface opposite the first wall surface, said wall being formed of a hydrogen-permeable iron alloy bearing initially chromium oxide on the first wall surface, and maintaining the wall and gas at a temperature and for a time sufficient to form graphite fibers on said first wall surface.

* * * * *